United States Patent [19]
Paulson

[11] Patent Number: 5,633,467
[45] Date of Patent: May 27, 1997

[54] APPARATUS AND METHOD FOR NON-DESTRUCTIVE TESTING OF STRUCTURES

[75] Inventor: Peter O. Paulson, Calgary, Canada

[73] Assignee: Pure Technologies Inc., Calgary, Canada

[21] Appl. No.: 556,936

[22] PCT Filed: Jun. 3, 1994

[86] PCT No.: PCT/CA94/00302

§ 371 Date: Dec. 1, 1995

§ 102(e) Date: Dec. 1, 1995

[87] PCT Pub. No.: WO94/29669

PCT Pub. Date: Dec. 22, 1994

[30] Foreign Application Priority Data

Jun. 4, 1993 [CA] Canada ................... 2097781

[51] Int. Cl.⁶ ................................................ G01L 11/24
[52] U.S. Cl. .......................... 73/800; 73/788; 356/35.5
[58] Field of Search ........................... 73/760, 763, 786, 73/788, 800; 356/35.5

[56] References Cited

U.S. PATENT DOCUMENTS

| | | | |
|---|---|---|---|
| 3,796,494 | 3/1974 | Takabayashi et al. | 356/106 R |
| 3,911,733 | 10/1975 | Bhuta et al. | 73/88 |
| 3,985,444 | 10/1976 | Takashima et al. | 356/109 |
| 4,276,698 | 7/1981 | Dore et al. | 33/174 L |
| 4,286,879 | 9/1981 | Jäger et al. | 356/358 |
| 4,436,419 | 3/1984 | Stetson et al. | 356/35.5 |
| 4,474,466 | 10/1984 | McDonach et al. | 73/800 |
| 4,526,465 | 7/1985 | Corti et al. | 356/35.5 |
| 4,591,986 | 5/1986 | Vachon | 364/508 |
| 4,740,081 | 4/1988 | Martens et al. | 356/345 |
| 4,815,855 | 3/1989 | Dixon | 356/358 |
| 4,850,693 | 7/1989 | Deason et al. | 356/35.5 |
| 4,872,751 | 10/1989 | Hercher | 356/35.5 |
| 5,004,345 | 4/1991 | Hung | 356/353 |
| 5,007,738 | 4/1991 | Grant | 356/347 |
| 5,040,431 | 8/1991 | Sakino et al. | 74/479 |
| 5,333,494 | 8/1994 | Kishima et al. | 73/788 |
| 5,371,588 | 12/1994 | Davis et al. | 356/349 |

*Primary Examiner*—Richard Chilcot
*Assistant Examiner*—Max H. Noori
*Attorney, Agent, or Firm*—Bennett Jones Verchere

[57] ABSTRACT

A method and apparatus for non-destructive testing of the load bearing characteristics of a structure are disclosed. An interferometer is supported by a beam which is supported away from the surface of the structure to be tested. The interferometer is used to measure a quantity which varies with the distance between the interferometer and a reflecting means supported on the location to be tested. The reflecting means is supported in such a manner as to move responsively with deformations to the said location, and is typically attached to a probe which is urged against the said location. Preferably a force is applied or varied near the location to be tested and comparisons are made over time or as the said force varies. Such a system does not damage the structure, and does not require complicated equipment or processing.

42 Claims, 3 Drawing Sheets

APPARATUS AND METHOD FOR NON-DESTRUCTIVE TESTING OF STRUCTURES

This invention relates to a method for non-destructive testing of structures, and apparatus for the carrying out of that method.

Many structures are subject to deterioration over time, with an adverse effect on their load bearing ability. Accordingly, it is necessary to test the structures periodically to determine whether a dangerous condition exists. Structures which require such periodic testing include concrete structures such as building floors, bridges and the like, and metal structures such as aircraft parts.

In some cases, structural testing involves the application of fairly large loads, such as filled water tanks, to provide significant deflection of the structure, and measuring that deflection. This can be dangerous if the load bearing capability of the structure has degraded seriously, as the structure may fail catastrophically under such a large load.

Other methods of testing structures require damaging the structure. For example, if an aircraft section is to be examined for cracks, paint must be removed from the area to be tested. If a concrete structure which is post tensioned by the use of tensioning cables is to be tested, concrete can be removed to expose a portion of the cable, either for optical examination or for testing by passing high frequency radio signals through the cable.

It would therefore be advantageous to have a method and apparatus for the measurement of the integrity of structures without the necessity of some destruction of the structure or of putting a load large enough to damage the structure on it.

For this reason, techniques such as interferometry have been proposed to determine surface deformations. For example, several patents have proposed putting diffraction gratings on an object to be tested, and measuring the deformation of such gratings by interferometry. Examples are found in U.S. Pat. No. 3,985,444 (Takashima) and U.S. Pat. No. 4,850,693 (Deason). Other patents have proposed taking holograms of a surface before stress, and after stress. An example is shown in U.S. Pat. No. 3,911,733 (Bhuta). Still other patents use variations of speckle interferometry, such as U.S. Pat. No. 4,591,996 (Vachon) and U.S. Pat. No. 4,436,419 (Stetson), or shearing interferometry, as shown in U.S. Pat. No. 5,005,345 (Hung).

It has also been taught to use a system with two interferometers, both having the same target points and vibrating a structure while measuring with the two interferometers, as shown in U.S. Pat. No. 4,526,465 (Corty). Other designs require reflection from a prism or the like attached to the structure to be tested, as is shown for example in U.S. Pat. No. 4,815,855 (Dixon).

In general, the prior art methods using interferometry are fairly cumbersome. In those methods which require comparison of holograms or other patterns taken at different times, care must be taken to position the device in exactly the same spot, so that comparable figures can be obtained. In many cases, complicated pieces of equipment are required, and complicated processing is necessary to get a useful result.

DESCRIPTION OF THE INVENTION

The invention provides a local measurement of the apparent stiffness or rigidity of a structure. One or more supports are placed on a surface of a structure to be tested, so that they transmit movements of that structure. The supports in turn support a beam, and transmit to it the movements of the structure which pass through the supports. At a portion of the beam which is unsupported by the supports, for example at a point roughly midway between two supports, a measurement is made of a quantity which varies with distance between the surface of the structure and the beam. As will be seen below, this need not be the actual distance, but only some quantity which will vary if the distance changes. This measurement is made under several different conditions, such as a lapse of considerable time or a variation of a deflecting force applied to the structure, and the variation in the measured quantity is noted. Because the variation is expected to be small, the measurement is typically made with an interferometer. Unlike the prior art methods of structural testing using interferometers, the interferometer does not measure interference patterns reflected from the surface of the structure, in order to determine the stresses in the structure. Instead, the interferometer measures a quantity which varies with changes in the distance from the reference beam to the surface of the structure. The quantity may be the actual distance, or the distance from the interferometer to the surface of the structure (the interferometer being rigidly coupled to the beam) or, the distance from the interferometer coupled to the beam to a probe which rests on the structure and is urged toward the structure, either by its weight or by an urging means, such as a spring. Alternately, the quantity may be the distance travelled by a portion of such a probe passing a reference point which is fixed with respect to the beam.

In the preferred embodiment the reference quantity is measured at a starting value, and then there is a change made in the force deflecting the structure near the point at which the quantity is being measured. This causes a relative movement between the structure and the beam portion on which the interferometer is mounted. The measured quantity varies with this relative movement, providing information about the load bearing capability of the structure.

The invention thus also provides a method for testing a structure, in which a beam is positioned on supports which rest on the structure, with the beam spanning the area of interest. A measurement is made of a quantity which varies as the distance varies between the beam and the structure being tested. A force deflecting the structure near the measuring site is then applied or varied, and the difference in deflection is determined. Results can be processed using suitable computer equipment to get a graph of deflection versus time, or versus force applied.

The measuring beam can also be shifted to different locations on the structure, to determine how the local deflection differs with the application of the same or a similar force at the different locations. In this case, results can be presented as a graph of amplitude of deflection versus position.

Other types of results useful for assessing the structure can also be obtained using these procedures.

Force can be exerted on the structure in a number of different ways. For example, a movable mass can be transported from a distant location to a location near the measuring point. Measurement can be made while the movable mass is in motion, or as discrete measurements when the mass is at the distant location and when it is at the location near the measuring point. Alternately, an eccentrically rotating mass or multiple masses can be placed near the measuring location. As the masses rotate, the vertical and horizontal components of the mass velocity vary, therefore providing a variable force on the surface of the structure.

Alternately, a linear moving mass can oscillate in a controlled manner so that the forces producing its acceleration vary between fixed greater and lesser values. The magnitude of the force can be varied to provide a range of forces and a resulting range of deflections.

Alternately, force can be supplied by mechanical, pneumatic or hydraulic or electric means supported from outside the portion of the structure being tested, and exerting a varying force on the structure.

In still another embodiment, force can be produced on a suitable structure by alternating the pressure of air or other fluid which uniformly stresses the structure either externally or internally. For this embodiment, the structure needs to be either in, or needs to form an enclosed space, so that the pressure within said space may be suitably altered. This embodiment is particularly useful for testing enclosed concrete structures, for example, grain silos, or the like.

It is particularly preferable to use a force applying means which oscillates. This enables measurements to be taken over several oscillations. These readings can then be compared and the readings for the same phase of the oscillation can be averaged over the several cycles, to provide a more accurate reading.

It is also possible simultaneously to move the measuring beam and the force producing mechanism while measuring, so as to provide a series of measurements taken over a particular path on the surface of the structure. If this is done, the measuring beam should not be coupled to the force producing means in a way which transmits the oscillating motion of the force producing assembly to the beam, except insofar as it is transmitted through the beam supports which rest on the structure to be tested. Thus, the force producing means and the measuring means can be moved independently, or they can be connected by strings or chains which do not transmit the oscillating motion of the force producing assembly to the measuring beam.

Force can also be provided by a mass oscillating linearly along a shaft. In this case, the shaft rotates, and the linear oscillation is produced by Uhing type bearings obliquely mounted so that the shaft progresses through the bearings as it rotates. The pattern of oscillation can therefore be controlled by cams which alter the pitch of the oblique bearings. The speed is controlled by the rate of rotation of the shaft.

The oscillating force can also be provided by the use of a stepper motor or linear actuator which oscillates the mass along a line or in an arc. The rate of acceleration can conveniently be controlled by a microprocessor operating the stepper motor or linear actuator. Alternately, the oscillating force can be supplied by coupling the output of a motor running at a substantially constant speed to an eccentric drive. This arrangement is preferred because it is mechanically simple and relatively trouble free.

There are a number of different ways in which useful measurements can be taken using the apparatus and method of the invention. For example, data for test can be measured at a plurality of locations on the structure, and the results compared. Valuable information can be obtained even if the precise test points are not known. Alternately, it is possible to locate test points precisely, and repetitively test at the same test points as part of a recurrent maintenance program. For example, tests could be made every six months or every year at each of the test points, and the results compared with the previous results. The test points need not be located to an accuracy of more than plus or minus 1 cm or so, in order to have a result which is comparable to a result taken previously at that test point. The locating of the test points can be done in a number of ways. Among these are the marking of the test points on the structure, or measuring the distance from the test points to a reference wall or other structure. Conveniently, measuring of distances can be done by an ultrasonic range finder or an optical range finder. Alternately, the distance travelled by the reference beam while being moved into position can be measured, so that the distance and direction are found relative to a known starting position. It is also possible to locate test points by using radio, microwave or other electromagnetic radiation to locate the points precisely by means of triangulation. Alternately, the measuring frame can have detectors associated with it which will locate a transponder or similar device buried in the structure at the reference point.

It is an advantage of the present invention that the measurements made are simple linear measurements. Measurements made at different test points can be directly compared with one another, or with measurements made at the same test point but an earlier time, without any calculation. By using suitable computer equipment, one can have a readout of the relative deflection between the beam and the structure instantaneously that the measurement is made. Thus, the operator can refer to the results of his measurements, and whether it is or is not necessary to make measurements at other points.

Data obtained from the apparatus of the present invention can be used in a variety of ways. For example, profiles or contours of deflections measured can be drawn versus position or versus time (in the case of the moving or oscillating force). These can then be compared to detect anomalies. Profiles or contours of similar areas can be compared, as can profiles or contours of the same areas taken under different conditions or at different times. It is also possible to compare a measured profile or contour with predicted results, or to compare measured deflections with gross loading deflections for larger areas of the structure, obtained by other means. Thus, a 50 meter bridge could be tested by measuring the deflection of the entire structure, by other conventional means, as a heavily loaded truck traverses it. These results can then be compared to the local deflections measured across a span of (for example) 5 meters with an oscillating load of 5,000 neutrons, to determine where along the length of the bridge the majority of the flexing occurs. The portions with considerable flexing could then be investigated by conventional methods.

If desired, the device can be equipped with two or more interchangeable beams having a different span between the points where they are supported on the structure. The comparison of data derived from the different spans allows more information about the structure to be obtained. Thus, the nature of the flexing can be examined to determine the shape and size of anomalies in flexing.

The apparatus and method of the invention are extremely simple to use, and require no special preparation or partial destruction of the structure. Further, the quantity measured is an actual measure of the load bearing stiffness of the structure, which is the precise thing which it is desired to determine. Thus, it is not necessary to infer information about load bearing stiffness from other features, such as electrical measurements or distortion of surface features.

If the invention is used with a suitably sharp and pointed probe, the probe can pass through carpet overlaying concrete, so that the investigation of the structural rigidity of the concrete can take place without the necessity of having to remove the carpet. Further, reinforcing mesh or bars in concrete do not affect the results of the inventive method, as they would investigations using electrical signals. Data is obtained in a digital form (i.e. a measure of the amount of deflection from a rest point). This means that comparisons can easily be drawn with other results from the same structure using the same method, without the necessity of any calibration or calculation.

The reference frame of the invention is typically used horizontally, with its supports resting firmly on the structure to be tested. Typically, the frame is maintained in place merely by its weight transmitted through the supports. However, it is possible also to place the reference frame in any orientation, vertical, horizontal, or even suspended upside down from the structure, if the supports are suitably formed to adhere the beam to the structure so that deflections of the structure at the supports are transmitted through to the beam. For example, the beam can be glued in place if it is vertically oriented (for example to test a portion of an airplane tail) or the side of a concrete storage silo, or if it is suspended upside down (for example to test the deflection of the underside of a bridge). In such cases, it may be more convenient to deliver the force from the other side of the structure to be tested. For example, where the beam is suspended from the underside of a bridge, the force may conveniently be delivered on the upper side of the bridge, opposite the point of measurement.

Another use of the present invention is by applying a static load to a surface which recovers slowly and then removing the load and measuring the recovery of the surface. For example, a load can be placed on an asphalt surface. The load can then be removed, and the beam of the invention placed so that its probe is located where the load sat on the asphalt surface. The interferometer readings can then be taken over a period of time as the asphalt surface recovers from the load, showing the rate of recovery, and hence the condition of the asphalt.

It is generally preferred that the apparatus of the invention provide the beam, on based supports, and a load which will deliver a simple repetitive force at a point near (i.e. within 20 centimetres or so) to the point at which the measurements are taken. For reproducibility of results, it is advisable to have a constant distance between the place at which the force is applied and the point on the structure at which the structures distance from the beam is being measured. A convenient way of doing this is by having the beam supported for movement between measuring locations by the apparatus that provides the load. Conveniently, this apparatus is a wheeled vehicle, which would support the beam by a pair of lifting arms. When it is desired to take a measurement, the lifting arms are decoupled from the beam, so that the beam is not connected to the vehicle carrying the load, and hence so that vibrations and deflections do not transmit through the lifting arms to the beam as the load is moved. However, transport in this way between measuring locations ensures that the distance between the beam and the point of delivery of the force remains substantially constant, so that results can be compared directly.

As mentioned, the invention also contemplates having the beam resting on its supports on the structure to be tested, while the load is moved across the surface. This is not preferred, as variations in the speed of the load or its acceleration may provide spurious results. It is therefore advisable, if this procedure is used, to ensure that the load moves at a constant acceleration or constant speed. However, despite the practical difficulty of ensuring constant speed or constant acceleration, this method is valuable, because it provides a direct measurement on the distribution of deflection in the structure being measured versus the position of the load. This is useful because it provides an immediate localization of small anomalies, which can then be investigated more precisely by using an oscillating or rotating load as discussed above.

Preferably, the beam is supported by two spaced supports which rest on the structure to be tested. There may be other supports as well, remote from this span between two supports, for example so that the beam will be supported by a triangular or quadrupedal arrangement, and will not fall over. It is also possible to have the beam supported only at one end, and cantilevered outwardly, with the interferometer supported at or near its distal end. This is not preferred, however, because a single pedestal support may be deflected from the vertical by deflections in the surface of the structure. This means that the angle of the interferometer of the surface may change, requiring a mathematical correction to the results in order to prevent errors.

Typically, the beam of the invention is relatively short, for example from 1 to 5 meters, so that it can easily be transported from place to place. It is found that measurements using beams of this length are suited for providing useful information about most structures. However, it is possible to use longer or shorter beams if this is desired in a particular situation.

Because the measurement of distance is only a relative measurement of the amount of deflection of the structure relative to the span provided by the beam, it can be carried out even if the structure is in motion. This contrasts with interferometric examination of structures using imaging means, which often require that the structure not be in motion, as the imaging means in on some external reference point which does not move with the structure.

As the results can be read off immediately, it is possible to do a reasonableness check on the data as it is being obtained. Thus, if a result appears anomalous, it is possible to provide for further testing, for example at nearby points, to confirm the correctness of the result.

By way of example, a particular embodiment of apparatus usable to carry out the invention will now be described, with reference to the drawings.

Figure 1:
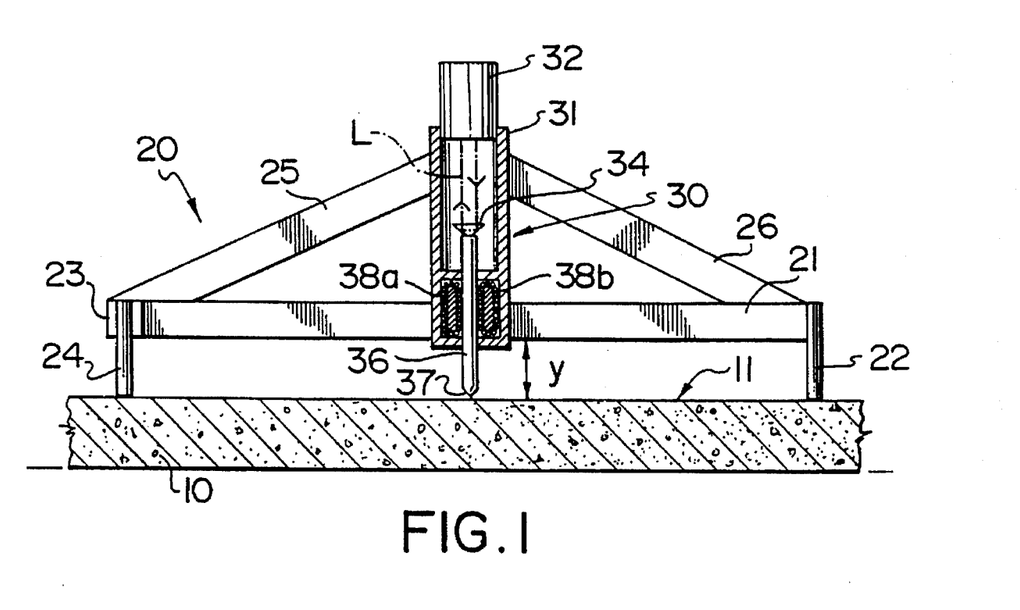
FIG. 1 shows a side elevation (partly cut away) of a reference beam and associated interferometer usable for practicing the invention.
Figure 2:
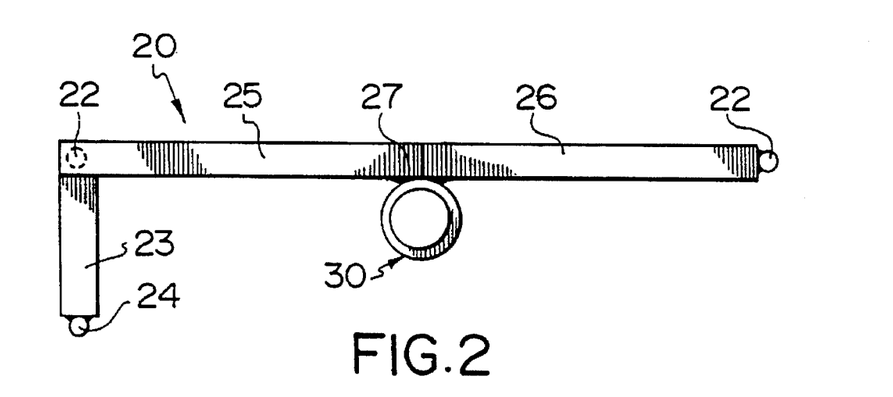
FIG. 2 shows a plan view of the same embodiment as FIG. 1.

Referring to FIGS. 1 and 2, a structure to be tested is indicated at 10. This structure as indicated is a concrete slab, for example slab floor on an upper floor in a high-rise office building.

Resting on the concrete slab, for the purpose of testing, is a test frame 20. This frame comprises a reference beam 21, which is supported on the surface 10 and spaced therefrom by feet 22. So that the structure remains upright on the surface, there is an additional beam 23 connected at one end of beam 21 therefore, and extending horizontally outwards at right angles to beam 21. This terminates in a leg 24. The three legs 22, 22 and 24 form a triangular support so that the beam 21 remains horizontal at an approximate distance Y above the surface 11 of structure 10.

An interferometer and probe unit, generally indicated as 30 is supported on beam 21 at approximately the mid-point thereof. For further rigidity, a diagonal beam 25 extends upwardly from the intersection of beams 21 and 23 and a diagonal beam 26 extends upwardly from the other end of beam 21 to support the upper portion of the unit 30.

The interferometer and probe unit 30 includes a housing 31 rigidly mounted to beam 21 and to diagonal beams 25 and 26, as by welding. The attachment to beams 25 and 26 is shown in FIG. 2 at 27. The housing supports at its upper end an interferometer 32. Suitably, this can be a commercially available interferometer. The types known as Fabry-Perot, Michaelson or Michaelson-Morley are suitable. Each of such interferometers has one or more fixed length light paths within the instrument and one external light path, and it has means for comparing the light which has travelled along the external path with light that has travelled along a fixed length internal light path.

The external light path (shown by the dotted line L) goes from the interferometer 32 to a retroreflector 34. Suitably, the retroreflector is a retroreflecting prism 34. However, a face silvered mirror arrangement which deflects the light back along a path parallel to its incident path would be satisfactory. A mirror arrangement deflecting the light along its incident path is also useable, but requires more complicated optics to separate the incident and reflected light at the interferometer. Reflection along an angled path can also be used, but requires a mathematic calculation.

The retroreflector 34 is mounted on the end of a probe 36. The probe 36 extends downwards out of the housing 31 to contact the surface 11 of the structure to be tested. Suitably, although not necessarily, the bottom end of the probe 36 is pointed, as is shown at 37. This facilitates a good contact of the probe 36 with the surface 11. Indeed, if the probe 36 is of sufficient weight to be strongly urged downward, and the point 37 is sharp, it can even pass through a surface layer of carpeting in order to make a connection with the concrete surface below some types of relatively loose weave. This is useful if operations are to be carried out in examining the structural rigidity of a building floor.

Suitably, the probe 36 is supported vertically in the housing 31 by a low friction arrangement, so that it is free to move vertically upward and downward. In the illustration, this low friction detention means is six circumferentially spaced races (two of which are shown as 38a and 38b) of circulating ball bearings. Other low friction means of supporting the probe can also be used. For example, the probe can be supported in bushings, or it can be supported from a bendable arm attached to the housing 31. The support should be such that the probe 36 remains in firm contact with the surface 11 when the probe is in use. This can be either by having the probe of sufficient weight so that its weight urges it downwards in contact with the surface 11, or else by having it urged downwardly by a spring which pushes against housing 31. It is preferred that the probe be urged downwardly by its own weight, as the use of a spring causes force to be transmitted to the housing 31, and therefore requires that the housing and its supporting frame to be designed so that unwanted deflections will not be set up in beam 21. The amount of friction in the device holding the probe is not very critical so long as there is sufficient mass of the probe or a spring which urges the probe into snug contact with surface 11. However, a low friction mounting is preferred.

Suitable means are also supplied (not shown) to immobilize probe 36, in a position where it is not touching surface 11, for transport and the like.

Figure 3:
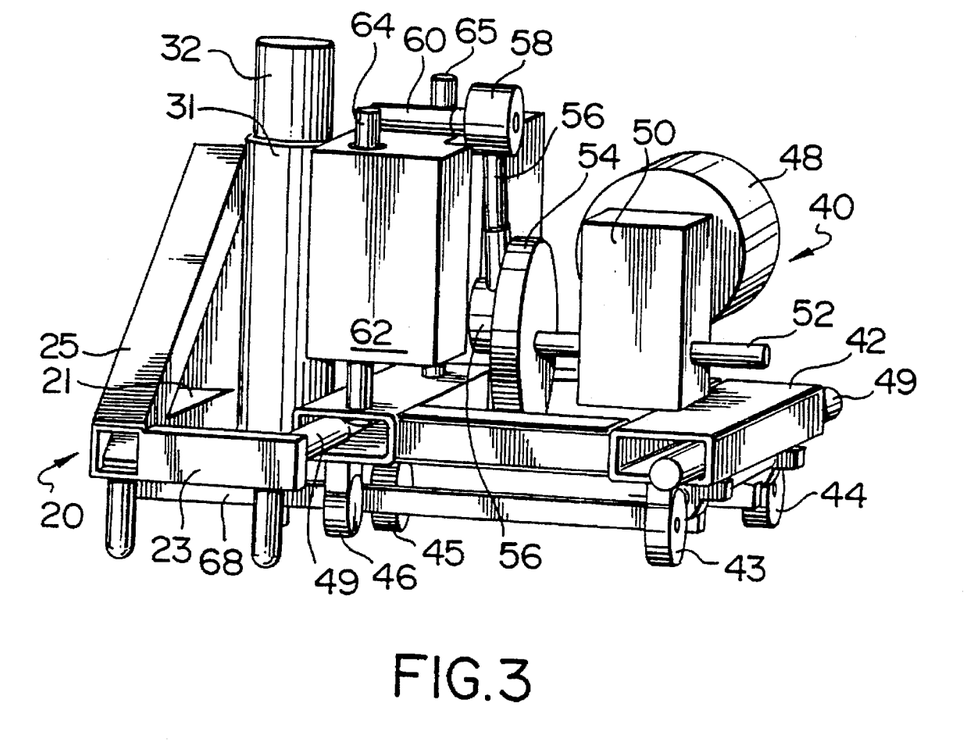
FIG. 3 shows a perspective view of a force applying unit suitable for use in the invention, with the reference beam unit as it would be in position for the taking of measurements.
Figure 4:
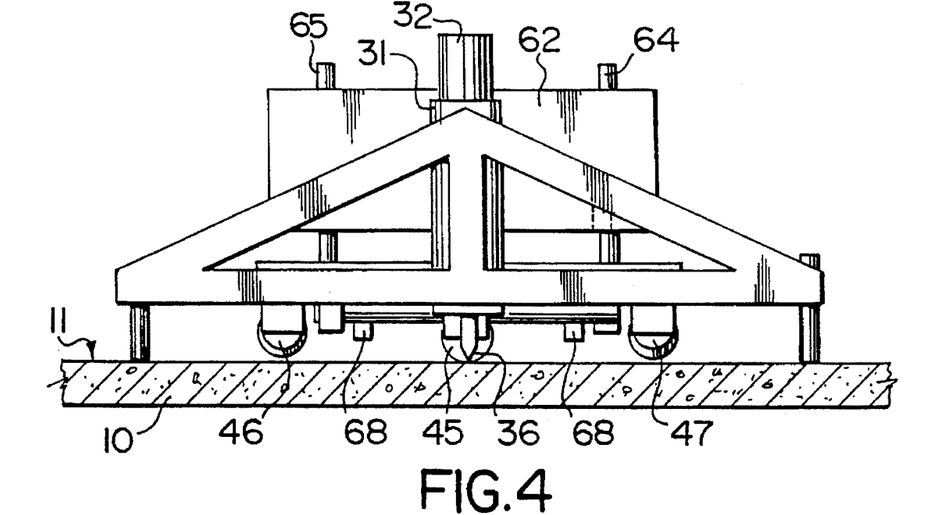
FIG. 4 shows a side view of FIG. 3.

Referring now to FIGS. 3 and 4, test frame 20 is shown in proximity to a force delivering apparatus for the carrying out the invention.

The force delivering apparatus 40 is mounted on a trolley 42 which runs on wheels 43, 44 and 45. Two additional safety wheels 46 and 47 are provided. In normal operation, safety wheels 46 and 47 do not touch the ground, but one or other will engage the ground if the trolley tips, so that it will not overbalance the trolley. In the embodiment shown, it is provided with handles 49 to facilitate manual displacement. However, it will be understood that it could be powered in any suitable way if desired. The trolley supports a motor 48, which is connected to a gear box 50, which is in turn connected to a shaft 52 which in turn bears an eccentric drive wheel 54 which connects to linkage 56, 58 to convert the rotary motion of shaft 52 to reciprocating linear motion. Linkage 58 is attached at 60 to a mass 62, which is free to slide on two columns 64 and 65 supported by trolley 42.

Suitably, mass 62 is a 100 kg weight. The motor permits the mass 62 to move up and down the columns 64 and 65, thereby providing a changing acceleration. The centre of gravity of mass 62 is located directly over wheel 45, so that the forces caused by changing acceleration provided by movement of the weight is transmitted directly through wheel 45 to surface 11.

Suitably, trolley 42 is also equipped with two lifter arms 68 (shown in FIGS. 3 and 4). These lifter arms can be raised and lowered, by suitable electrical, mechanical or hydraulic means (not shown). They can be used to support frame 20 for transport of frame 20 from one location to another. When it is decided to transport frame 20, lifter arms 68 are raised hydraulically until they engage bar 21. This lifts frame 20 off the surface 11, and it is supported for transport to the next location on arms 68. On arrival, arms 68 are lowered, so that they no longer contact frame 20.

Of course, it is not necessary to have the reference frame transported by the trolley which supports the weight, but it is convenient to do so, as this causes the relative positions of the reference beam and the transmission of force from mass 62 to the structure to remain constant.

In operation of the preferred embodiment, trolley 42, with reference frame 20 supported on arms 68, is wheeled to a place where a reading is desired to be taken. Arms 68 are lowered, so that the reference frame sits securely on surface 11. The interferometer is then connected to computer equipment, so that its readings can be visually displayed. The computer equipment can be mounted on trolley 42 or on another trolley, which is wheeled to a convenient position and connected to the interferometer.

Motor 48 is then actuated, so that mass 62 oscillates up and down. An oscillation speed of 3 Hertz is suitable, but the speed is not critical. The oscillation transmits a varying acceleration force through trolley 42 to wheel 45 and thence to structure 10.

The force transmitted to structure 10 sets up small deflections of structure 10. End 37 of probe 36 is firmly in contact with structure 10, and these deflections cause probe 36 to move upwardly and downwardly. Retroreflector 34 moves with probe 36, so that light path L changes its length. This causes a change of the interference fringes when the interferometer compares light path L with affixed light path internal to the interferometer.

Suitably, the interferometer is a Model LARS-100 interferometer made by Gradient Lens Corporation. This is a Michaelson-Morley type interferometer which transmits a light beam at 637 nanometers. With this arrangement, deflections of as small as 80 nanometers can be measured. Of course, other interferometers, using light at different wavelengths, would give different accuracies of measurement.

It is found that, when a structurally sound concrete floor of approximately 7" in thickness, and reinforced with steel cables, is tested using a reference beam of 1 meter, deflections of the order of 2,500 nanometers are measured from the oscillation of the 100 kg weight. Measurements are conveniently made over at least 20 oscillations and averaged, to reduce any random error. The figures given represent oscillations at a point at least 3 meters away from any wall or pillar. As that represented typical oscillations as one approaches a wall or pillar, the amplitude of the oscillations decreases.

Figure 5:
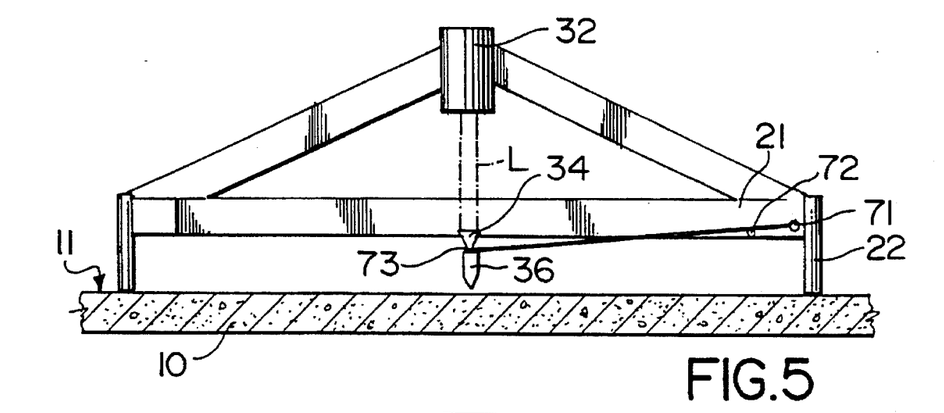
FIGS. 5 and 6 show reference beams with modified probe supports.
Figure 6:
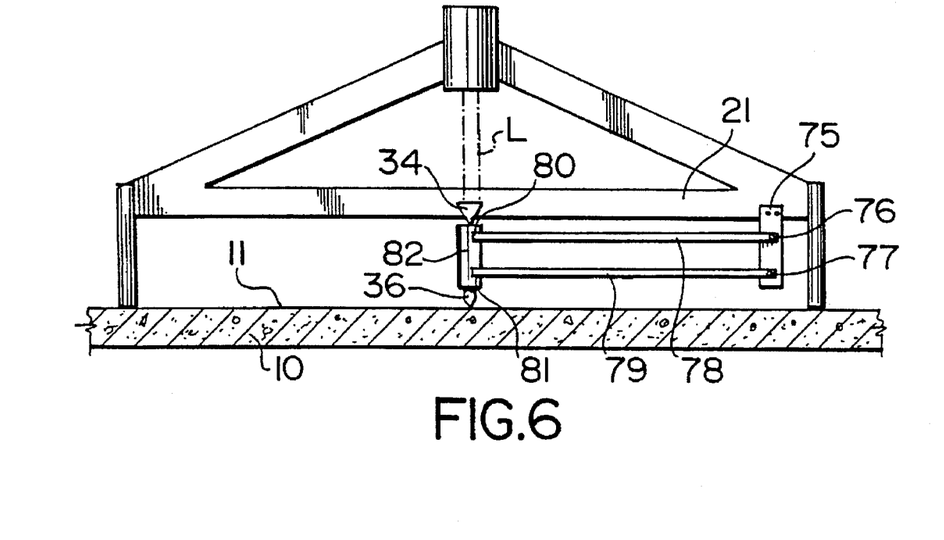

FIGS. 5 and 6 show alternate ways of mounting the probe. They are views similar to that of FIG. 1, and the reference numerals of FIG. 1 are used, insofar as possible.

In FIG. 5, probe 36 and retroreflector 34 are mounted at the end of a wide band of flexible spring steel 70. The band 70 is attached to beam 21, close to one of the legs 22, as by two bars 71 and 72 which fit into holes in beam 21 and are welded into such holes, and which are spot welded to the top and bottom respectively of band 70. Band 70 is also welded to probe 36 at 73. Band 70 is sufficiently wide (for example ½") so that it keeps probe 36 from lateral movement toward and away from beam 22, as band 70 does not flex in such lateral direction. However, band 70 flexes so that probe 36 can move up and down toward and away from interferometer 32. Thus, probe 36 is free to move with deflections in the surface 11 of structure 10, and the light path L changes with such deflection.

In FIG. 6, a member 75 is rigidly connected to beam 21 and extends downwardly therefrom. Beam 75 has two pivot points 76 and 77 attached pivotally to these two pivot points are two rods 78 and 79 which are also pivotally attached to pivots 80 and 81 to a probe carrying member 82. The probe 36 extends downwardly from member 82 to the surface 11 of structure 10. Also mounted on member 82 is the retroreflector 34. The parallel linkage thus set up by rod 78 and 79 permits upward and downward movement of the probe 36, but does not permit significant movement towards and away from bar 21.

It will be apparent that many other changes may be made to the illustrative embodiments, while falling within the scope of the invention and it is intended that all such changes be covered by the claims appended hereto.

The embodiments of the invention in which an exclusive property or privilege is claimed are defined as follows:

1. A system for non-destructive testing of the load bearing characteristics of a structure, said system comprising:

an apparatus having a member (21) supported away from the surface (11) of the structure (10) to be tested by one or more supports (22, 24) in contact with the structure;

measuring means (30) adapted to measure a quantity which varies with distance between the surface of the structure and a point on the said member remote from any of the said supports, said measuring means including an interferometer (32);

reflecting means (34) which move responsively with deformations of the said surface;

said reflecting means and said interferometer together define at least one external optical path which varies with said quantity;

a probe (36) urged against the area of the structure to be tested, said probe supported so as to allow said probe to move responsively with deformations of the said area, wherein said reflecting means is attached to said probe, the probe being supported by said member by means of a low friction arrangement selected from the group consisting of:

bushings within a housing attached to said member;

a bendable arm attached to said member;

a flexible spring steel (70) attached to said member; and a pair of pivot arms (78, 79) pivotally connected to said probe, said pivot arms pivotally connected to a second member (75) rigidly connected to said support member; and, means (40) for both applying a force on the structure and varying repetitively said force in a predetermined manner, at a location near the area to be tested.

2. The system as defined in claim 1 wherein said probe is urged against the structure by means of the weight of said probe.

3. The system as defined in claim 1 further comprising a spring wherein said probe is urged against the structure by means of said spring.

4. The system as defined in claim 1 wherein said reflecting means comprises a retroreflecting prism.

5. The system as defined in claim 1 wherein said member is cantilevered from a single support.

6. The system as defined in claim 1 wherein said member is supported by at least three supports.

7. The system as defined in claim 1 wherein said measuring means is supported by said member.

8. A system for non-destructive testing of the load bearing characteristics of a structure, said system comprising:

an apparatus having a member (21) supported away from the surface (11) of the structure (10) to be tested by one or more supports (22, 24) in contact with the structure;

measuring means (30) adapted to measure a quantity which varies with distance between the surface of the structure and a point on the said member remote from any of the said supports, said measuring means including an interferometer (32);

reflecting means (34) which move responsively with deformations of the said surface;

said reflecting means and said interferometer together define at least one external optical path which varies with said quantity;

a probe (36) urged against the area of the structure to be tested, said probe supported so as to allow said probe to move responsively with deformations of the said area, wherein said reflecting means is attached to said probe, the probe being supported by said member by means of a low friction arrangement of circumferentially spaced races of circulating ball bearings (38a, 38b) within a housing (31) attached to said member and, means (40) for both applying a force on the structure and varying repetitively said force in a predetermined manner, at a location near the area to be tested.

9. The system as defined in claim 8 wherein said probe is urged against the structure by means of the weight of said probe.

10. The system as defined in claim 8 further comprising a spring wherein said probe is urged against the structure by means of said spring.

11. The system as defined in claim 8 wherein said reflecting means comprises a retroreflecting prism.

12. The system as defined in claim 8 wherein said member is cantilevered from a single support.

13. The system as defined in claim 8 wherein said member is supported by at least three supports.

14. The system as defined in claim 8 wherein said measuring means is supported by said member.

15. A system for non-destructive testing of the load bearing characteristics of a structure, said system comprising:

an apparatus having a member (21) supported away from the surface (11) of the structure (10) to be tested by one or more supports (22, 24) in contact with the structure and measuring means (30) adapted to measure a quantity which varies with distance between the surface of the structure and a point on the said member remote from any of the said supports; and, means (40) for both applying a force on the structure and varying repetitively said force in a predetermined manner, at a location near the area to be tested, wherein the means for applying a force includes means (58) for oscillating a mass and means (45) for transmitting the force to the surface of the structure and said means for oscillating a mass including:

a mass (62) slidably mounted on at least one column (64, 65) and having a centre of gravity;

a motor (48) for rotating a shaft;

means (50, 52, 54, 56, 58) for converting the rotary motion of said shaft into reciprocating linear motion;

the centre of gravity of the said mass being located directly over the said means for transmitting the forces generated by the said moving mass.

16. The system as defined in claim 15 wherein said reflecting means comprises a retroreflecting prism.

17. A system for non-destructive testing of the load bearing characteristics of a structure, said system comprising:

an apparatus having a member (21) supported away from the surface (11) of the structure (10) to be tested by one or more supports (22, 24) in contact with the structure;

measuring means (30) adapted to measure a quantity which varies with distance between the surface of the structure and a point on the said member remote from any of the said supports, said measuring means including an interferometer (32);

reflecting means (34) which move responsively with deformations of the said surface, said reflecting means comprising a retroreflecting prism;

said reflecting means and said interferometer together define at least one external optical path which varies with said quantity a probe (36) urged against the area of the structure to be tested, said probe supported so as to allow said probe to move responsively with deformations of the said area, the reflecting means being attached to said probe; and, means (40) for both applying a force on the structure and varying repetitively said force in a predetermined manner, at a location near the area to be tested.

18. The system as defined in claim 17 wherein said member is cantilevered from a single support.

19. The system as defined in claim 17 wherein said member is supported by at least three supports.

20. The system as defined in claim 17 wherein said measuring means is supported by said member.

21. The system as defined in claim 17 wherein the portion (37) of said probe which is urged against said structure is pointed.

22. The system as defined in claim 17 wherein the probe is supported by said member by means of a low friction arrangement.

23. The system as defined in claim 22 wherein said low friction arrangement is selected from the group consisting of:

bushings within a housing attached to said member;

a bendable arm attached to said member;

a flexible spring steel (70) attached to said member;

a pair of pivot arms (78, 79) pivotally connected to said probe, said pivot arms pivotally connected to a second member (75) rigidly connected to said support member; or circumferentially spaced races of circulating ball bearings (38a, 38b) within a housing (31) attached to said member.

24. A method for non-destructive testing of structures by measuring deformations to portions of a structure, said method comprising the steps of:

applying a static load to a location of a structure (10) to be tested;

replacing the load with a beam (21) suspended above the location to be tested, said beam supported by one or more supports (22, 24) resting on the structure remote from the location to be tested in such a manner so as to transmit to the said beam movements of the said structure proximate to the said supports;

measuring repeatedly a quantity which varies with the distance between a portion of the said beam remote from the said supports and the said location to be tested as the location recovers the measuring step comprising:

supporting reflecting means (34) which moves responsively with deformations to the location to be tested;

utilizing an interferometer (32), in conjunction with said reflecting means, to measure the said quantity.

25. The method as defined in claim 24 further comprising the step of comparing said measurements of deformation over time or as the static load applied to the structure varies.

26. A method for non-destructive testing of structures by measuring deformations to portions of a structure, said method comprising the steps of:

applying a static load to a location of a structure (10) to be tested;

replacing the load with a beam (21) suspended above the location to be tested, said beam supported by one or more supports (22, 24) resting on the structure remote from the location to be tested in such a manner so as to transmit to the said beam movements of the said structure proximate to the said supports;

measuring repeatedly a quantity which varies with the distance between a portion of the said beam remote from the said supports and the said location to be tested as the location recovers; and, comparing said measurements of deformation over time or as the static load applied to the structure varies.

27. The method as defined in claim 26 wherein the said measuring step comprises:

supporting reflecting means (34) which moves responsively with deformations to the location to be tested;

utilizing an interferometer (32), in conjunction with said reflecting means, to measure the said quantity.

28. A system for non-destructive testing of the load bearing characteristics of a structure, said system comprising:
- an apparatus having a member (21) supported away from the surface (11) of the structure (10) to be tested by being cantilevered from a single support in contact with the structure and measuring means (30) adapted to measure a quantity which varies with distance between the surface of the structure and a point on the said member remote from the said support, the measuring means including:
- an interferometer (32);
- reflecting means (34) which move responsively with deformations of the said surface;
- said reflecting means and said interferometer together define at least one external optical path which varies with said quantity;
- means (40) for both applying a force on the structure and varying repetitively said force in a predetermined manner, at a location near the area to be tested.

29. The system as defined in claim 28 wherein the apparatus further includes a probe (36) urged against the area of the structure to be tested, said probe supported so as to allow said probe to move responsively with deformations of the said area, wherein said reflecting means is attached to said probe.

30. The system as defined in claim 28 wherein the probe is supported by said member by means of a low friction arrangement.

31. The system as defined in claim 30 wherein said low friction arrangement is selected from the group consisting of:
- bushings within a housing attached to said member;
- a bendable arm attached to said member;
- a flexible spring steel (70) attached to said member;
- a pair of pivot arms (78, 79) pivotally connected to said probe, said pivot arms pivotally connected to a second member (75) rigidly connected to said support member; or
- circumferentially spaced races of circulating ball bearings (38a, 38b) within a housing (31) attached to said member.

32. The system as defined in claim 28 wherein said reflecting means comprises a retroreflecting prism.

33. A system for non-destructive testing of the load bearing characteristics of a structure, said system comprising:
- an apparatus having a member (21) supported away from the surface (11) of the structure (10) to be tested by at least three supports (22, 24) in contact with the structure and measuring means (30) adapted to measure a quantity which varies with distance between the surface of the structure and a point on the said member remote from any of the said supports, the measuring means including:
- an interferometer (32);
- reflecting means (34) which move responsively with deformations of the said surface;
- said reflecting means and said interferometer together define at least one external optical path which varies with said quantity;
- means (40) for both applying a force on the structure and varying repetitively said force in a predetermined manner, at a location near the area to be tested.

34. The system as defined in claim 33 wherein the apparatus further includes a probe (36) urged against the area of the structure to be tested, said probe supported so as to allow said probe to move responsively with deformations of the said area, wherein said reflecting means is attached to said probe.

35. The system as defined in claim 33 wherein the probe is supported by said member by means of a low friction arrangement.

36. The system as defined in claim 35 wherein said low friction arrangement is selected from the group consisting of:
- bushings within a housing attached to said member;
- a bendable arm attached to said member;
- a flexible spring steel (70) attached to said member;
- a pair of pivot arms (78, 79) pivotally connected to said probe, said pivot arms pivotally connected to a second member (75) rigidly connected to said support member; or
- circumferentially spaced races of circulating ball bearings (38a, 38b) within a housing (31) attached to said member.

37. The system as defined in claim 33 wherein said reflecting means comprises a retroreflecting prism.

38. A system for non-destructive testing of the load bearing characteristics of a structure, said system comprising:
- an apparatus having a member (21) supported away from the surface (11) of the structure (10) to be tested by one or more supports (22, 24) in contact with the structure and measuring means (30) supported by said member and adapted to measure a quantity which varies with distance between the surface of the structure and a point on the said member remote from any of the said supports, the measuring means including:
- an interferometer (32);
- reflecting means (34) which move responsively with deformations of the said surface;
- said reflecting means and said interferometer together define at least one external optical path which varies with said quantity;
- means (40) for both applying a force on the structure and varying repetitively said force in a predetermined manner, at a location near the area to be tested.

39. The system as defined in claim 38 wherein the apparatus further includes a probe (36) urged against the area of the structure to be tested, said probe supported so as to allow said probe to move responsively with deformations of the said area, wherein said reflecting means is attached to said probe.

40. The system as defined in claim 38 wherein the probe is supported by said member by means of a low friction arrangement.

41. The system as defined in claim 40 wherein said low friction arrangement is selected from the group consisting of:
- bushings within a housing attached to said member;
- a bendable arm attached to said member;
- a flexible spring steel (70) attached to said member;
- a pair of pivot arms (78, 79) pivotally connected to said probe, said pivot arms pivotally connected to a second member (75) rigidly connected to said support member; or
- circumferentially spaced races of circulating ball bearings (38a, 38b) within a housing (31) attached to said member.

42. The system as defined in claim 38 wherein said reflecting means comprises a retroreflecting prism.

* * * * *